US008825865B2

(12) United States Patent
Anderson et al.

(10) Patent No.: US 8,825,865 B2
(45) Date of Patent: Sep. 2, 2014

(54) TRAFFIC PLANNING IN A NETWORK USING A VARIABLE OVERSUBSCRIPTION FACTOR

(75) Inventors: Howard Anderson, Ashburn, VA (US);
Hemanth Pawar, Brambleton, VA (US);
Hetal Mistry, Ashburn, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 327 days.

(21) Appl. No.: 13/439,938

(22) Filed: Apr. 5, 2012

(65) Prior Publication Data

US 2013/0268671 A1 Oct. 10, 2013

(51) Int. Cl.
*G06F 15/173* (2006.01)
*H04L 12/28* (2006.01)
*H04L 12/56* (2006.01)

(52) U.S. Cl.
USPC ............................ 709/226; 370/389; 370/397

(58) Field of Classification Search
CPC combination set(s) only.
See application file for complete search history.

(56) References Cited

U.S. PATENT DOCUMENTS

| 6,006,018 | A | * | 12/1999 | Burnett et al. | ................ 709/219 |
| 6,639,916 | B1 | * | 10/2003 | Wakizaka | ..................... 370/397 |
| 7,852,839 | B2 | * | 12/2010 | Brinner | ........................ 370/389 |
| 2006/0188885 | A1 | * | 8/2006 | Bodian et al. | ..................... 435/6 |

* cited by examiner

*Primary Examiner* — David Lazaro
*Assistant Examiner* — Mahran Abu Roumi

(57) ABSTRACT

A system and methodology for network planning in which a software based tool provides network engineers with the capability to more precisely plan for traffic loading within the network on a cell site by cell site basis. Thus for each cell site, variations in geographic location, device mix, historical usage patterns and other factors are taken into account to allow for more accurate network planning and for more efficient use of capital. Cell sites with a higher traffic profile based upon historic device mix and usage patterns will be associated with lower OSF values thus enhancing the user experience for a device user in communication with that cell site. On the other hand, for cell sites with a lesser traffic profile, a higher OSF value is ascribed thus allowing for capital to be deployed elsewhere while still maintaining a positive user experience for users relying on that cell site.

14 Claims, 3 Drawing Sheets

TRAFFIC PLANNING IN A NETWORK USING A VARIABLE OVERSUBSCRIPTION FACTOR

FIELD OF THE INVENTION

The present invention is directed generally to traffic planning within wireless networks, and, more particularly to a provisioning and network design tool for use in connection with traffic planning in wireless networks.

BACKGROUND OF THE INVENTION

RF engineers attempt to design wireless networks so as to maximize the user experience while minimizing the cost to create that experience. Because of the natural usage patterns associated with devices that connect to these networks, the network devices are typically oversubscribed in an attempt to improve data throughput for the same relative cost. Oversubscribing refers to the situation where a network provider/ISP sells more collective bandwidth to customers than the network can technically provide based on the extremely low likelihood that all of the customers will be using all of their devices and all of their purchased bandwidth at the same time.

In order to measure the level of oversubscription in a network at a specific time and/or at a specific node of the network, a variable commonly referred to as a "oversubscription factor" (OSF) is typically used. This measure refers to the ratio of the allocated bandwidth per user to the guaranteed bandwidth promised to the user. The fact that the former value is a multiple of the latter value is a reflection of the reality that statistically few users will attempt to utilize their allocated bandwidth simultaneously.

ISPs and other network operators typically used a fixed OSF as a design factor associated with all or specific portions of the network. In typical deployments, the OSF value may range somewhere from 20 to 50. A busy network (i.e. one with significant loading and contention) would typically have a lower OSF such as 20, while a lightly loaded network (i.e. one with less loading and contention) might have a higher OSF in the range of 50 or so.

The OSF is used in network planning also to estimate the number of simultaneously active users on the network or at various nodes of the network. What is known as Average User Experience or Speed may be defined as the Total Capacity of the network or node divided by the number of simultaneous active users in the network or the applicable node. The number of simultaneous active devices can thus be calculated as follows:

$$\text{Simultaneous Active Devices} = \frac{\text{Total Devices}}{\text{OSF}}$$

And the user experience can be calculated as:

$$\text{User Experience} = \frac{\text{Capacity}}{\text{Simultaneous Active Devices}}$$

For most network planning applications, a fixed OSF value has been generally acceptable. However, the use of a fixed OSF value does not take into account or address a varied device mix within a network such as in a wireless network. For example, a wireless network may be accessed a mix of large number of fixed modems, and a large number of smartphones. Fixed modems typically are used within the home as the primary source of the occupants' access to internet including many broadband based applications requiring the transfer of large amounts of data. On the other hand, smartphones are mobile devices that typical consume significantly lesser amounts of data. Hence, the OSF of a cell site wherein Fixed Modems dominate the device mix would be low, while the OSF of a cell site where Smartphones are more prevalent would be significantly higher. As a result, when a fixed OSF value is assumed, actual network behavior can and does deviate, sometimes drastically, from forecasted behavior.

In a modern wireless network with hundreds or thousands of cell sites and with a device mix consisting of a wide variety of devices each with different usage patterns and data demands, a fixed OSF calculation leaves much to be desired. For cell sites with less loading and contention, a fixed OSF may be too high for that particular node and therefore planning could be impacted both in terms of an over allocation of resources as well as a user experience which deviates from the expected experience. Alternatively, at cell sites where there is significantly more traffic (such as those with a fixed modem heavy usage pattern), the selected fixed OSF may be too low to be effective for the specific device mix and the user experience may be significantly degraded from expectations.

SUMMARY OF THE INVENTION

It is thus a primary object of the invention to provide a system and methodology in which network planning measurements can be more accurately achieved to more closely align with real world network loading and performance which in turn allows for more effective use of capital and enhancement of the user experience.

It is another object of the present invention to provide a system and methodology for network planning in connection with networks that are subject to varying device mixes and in which a fixed OSF assumption is deficient.

It is another object of the present invention to provide a system and methodology for network planning in connection with wireless networks wherein a variable OSF based on tonnage per device is used.

It is yet another object of the present invention to provide a network planning methodology in which a unique and variable OSF is associated with each cell site within the network.

These and other objects of the present invention are achieved through a novel system and methodology for network planning in which a software based tool provides network engineers with the capability to more precisely plan for traffic loading within the network on a cell site by cell site basis. Thus for each cell site, variations in geographic location, device mix, historical usage patterns and other factors can be taken into account to allow for more accurate network planning and for more efficient use of capital. For example, cell sites with a higher traffic profile based upon historic device mix and usage patterns will be associated with lower OSF values thus enhancing the user experience for a device user in communication with that cell site. On the other hand, for cell sites with a lesser traffic profile, a higher OSF value may be ascribed thus allowing for capital to be deployed elsewhere while still maintaining a positive user experience for users relying on that cell site.

DETAILED DESCRIPTION OF THE INVENTION

According to the teachings of the present invention, usage data associated with the specific device mix historically seen at a specific cell site and/or the network in general is used to determine a variable OSF value for use at each cell site so as to maximize capital expenditures as well as to ensure the user experience is as good as possible given available resources.

Figure 1:
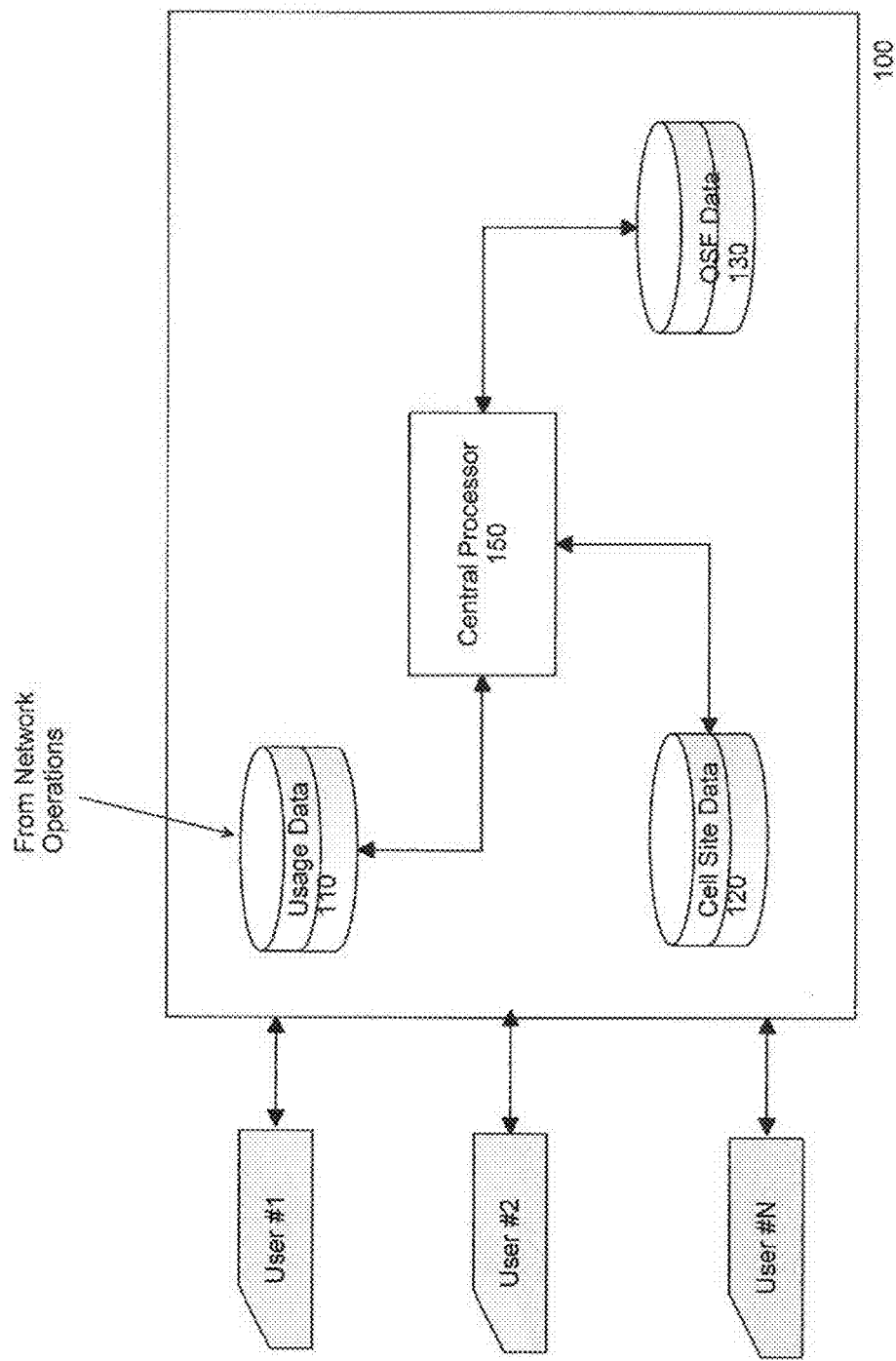
FIG. 1 is a diagram illustrating the system of the present invention in a preferred embodiment thereof.

With reference to FIG. 1, the present invention may be deployed in one embodiment as a network planning tool available for use by engineers in connection with initial network design as well as in connection with network growth, expansion and re-configuration depending upon changing usage, device and subscriber patterns. In a preferred embodiment, the planning tool of the present invention is made available as a software system running on a personal computer or other computing platform. Preferably, data provided to the system as well as data generated from system can be shared between and among users so that they may collaborate on network design and reallocation of network resources. Further, in a preferred embodiment, users may collaboratively work with the system and share data even from multiple locations which may be remote from one another.

System 100 includes a number of components in connection with generating variable OSF values by cell site according to the teachings of the invention. Users 1 through N communicate with system 100 through personal computers, terminals or other computing devices. A local copy of the software comprising system 100 may be present on the user's device or more preferably, system 100 may be centrally located on a server with access available as known in the art from one or more users.

System 100 includes central processor 150 which performs the calculations necessary to generate the variable OSF values by cell site as described in further detail below. In addition, cell site data repository 120 stores data regarding the network and the various cell sites included therein including geographic data and other data as may be desirable and which is associated with the various cell sites deployed throughout the network. Usage data repository 110 receives and stores data regarding device mix, device usage and other related data which is historically seen at each cell site. This data is received over time from the network operations center associated with the network and is updated periodically. Finally, generated OSF data which is determined by central processor 150 as described below is stored and made available in OSF data repository 130.

Turning now to the generation of variable OSF calculations as performed by central processor 150 according to the teachings of the present invention, it is first possible to generate a simple format of variable OSF as follows. In this case, it is assumed that a network employs an OSF of 25 as a base value and further that at each cell site in the network, the monthly tonnage value on an average basis is 10.95 GB per device. These assumptions are made as a starting point based on historical data available from the network operations center. It is then possible to obtain the unique variable OSF to be used for each individual cell site by determining the corresponding actual average usage for the device mix of that cell site. This allows OSF to be scaled as follows:

$$\text{Simultaneous Devices} = \frac{\text{Total Devices}}{OSF}$$

Where Simultaneous Devices is the expected number of devices at that cell site to be concurrently active at any one time and where Total Devices is the total number of devices assigned to or otherwise associated with that cell site. Thus, variable OSF for a specific cell site, using the above assumptions, is given as:

$$OSF = \frac{10.95 \ GB}{\text{Tonnage Per Device}} * 25$$

Given the above, a variable OSF value for each cell site can thus be calculated based on scaling the base OSF of 25 based on the actual tonnage per device historically seen at a particular cell site given a particular time frame. Of course, this value can be changed periodically over time as traffic patterns and device mix changes over time at each applicable cell site. That information may be provided to system 100 from the Network Operations Center (NOC) or through some other network resource periodically to allow for periodic OSF scaling as described above based on actual historic device data usage.

While the above implementation improves upon the prior art fixed OSF approach, it is still not ideal in light of the required assumptions of a base OSF of 25 and a standard value of 10.95 GB average monthly tonnage rate per device. So, while the use of differing values of OSF at different cell sites based on the above calculation is an improvement, it is still possible to obtain more accurate OSF values on a per cell site basis. It should be noted that in addition to applying a variable OSF on a per cell site basis, it is also possible to apply the OSF variations at different levels within the network architecture. For example, each sector at a cell site could be associated with a different OSF based on expected/historical data usage within that sector and thus a specific number of carriers may be assigned to that sector as a result of the OSF which is determined for that sector.

According to a preferred embodiment of the present invention, an advanced calculation may be performed by system 100 for generating individual cell site (or sector) OSF values. Based upon the two equations shown above, the following may be used for the simultaneous devices calculation in order to determine the expected number of devices active in the cell (or in the sector) at any given time:

$$\text{Simultaneous Devices} = \frac{\text{Total Devices}}{\frac{10.95 \ GB}{\text{Tonnage Per Device}} * 25}$$

This leads to:

$$\text{Simultaneous Devices} = \frac{(\text{Total Devices} * \text{Tonnage Per Device})}{10.95 * 25}$$

Which in turn provides the following:

$$\text{Simultaneous Devices} = \text{Constant} * \text{Tonnage Per Carrier}$$

Where the constant is a fractional value applied to the tonnage per carrier (which is equivalent to Total Devices*Tonnage Per Device) to derive the expected devices active concurrently.

Thus, system 100 in a preferred embodiment, employs a mathematical model in which "simultaneous devices" is a function of a constant times monthly tonnage per carrier. This format addresses the efficiency and loading condition of a carrier while at the same time estimating the simultaneous activity associated with that carrier. Regression testing was undertaken to determine the most appropriate value for the constant. In this case, the constant was further refined such that the equation for determining Simultaneous Active Devices could be expressed as:

$$\text{Simultaneous Active Devices} = \frac{\text{RF Utilization} * \text{Tonnage Per Carrier}}{\text{Constant} * \text{Max Carrier Capacity}} \quad (1)$$

Wherein RF utilization, as is known in the art, reflects the number of physical slots utilized on a carrier (on an average basis) as a percentage of the total available physical slots and wherein Max Carrier Capacity represents the theoretical maximum throughput support on a sector carrier typically expressed in megabits per second. A typical value for Max Carrier Capacity may be on the order of 10 megabits per second. Equation (1) could also be modified/simplified to eliminate one or more of the components such as, for example, RF Utilization.

Based on regression analysis performed using the above equation in connection with the assignee's WiMAX network, a value of 26.000002483411 was derived. Of course, as is known by one of ordinary skill in the art, this value will vary based upon various network characteristics such as the customer usage profile associated with each cell site in the network. Thus the constant will vary as a result of factors such as the traffic peak times and the intensity of those peaks. As a result of the above derivation, an advance format variable OSF may be determined by system 100 and used for network planning purposes. This value, as periodically determined for each cell site or for each sector in a network, advantageously takes into account RF conditions of the serving carrier and also, importantly, is a function of the usage (tonnage) behavior of the devices associated with the cell site or carrier as that varies over time.

Figure 2:
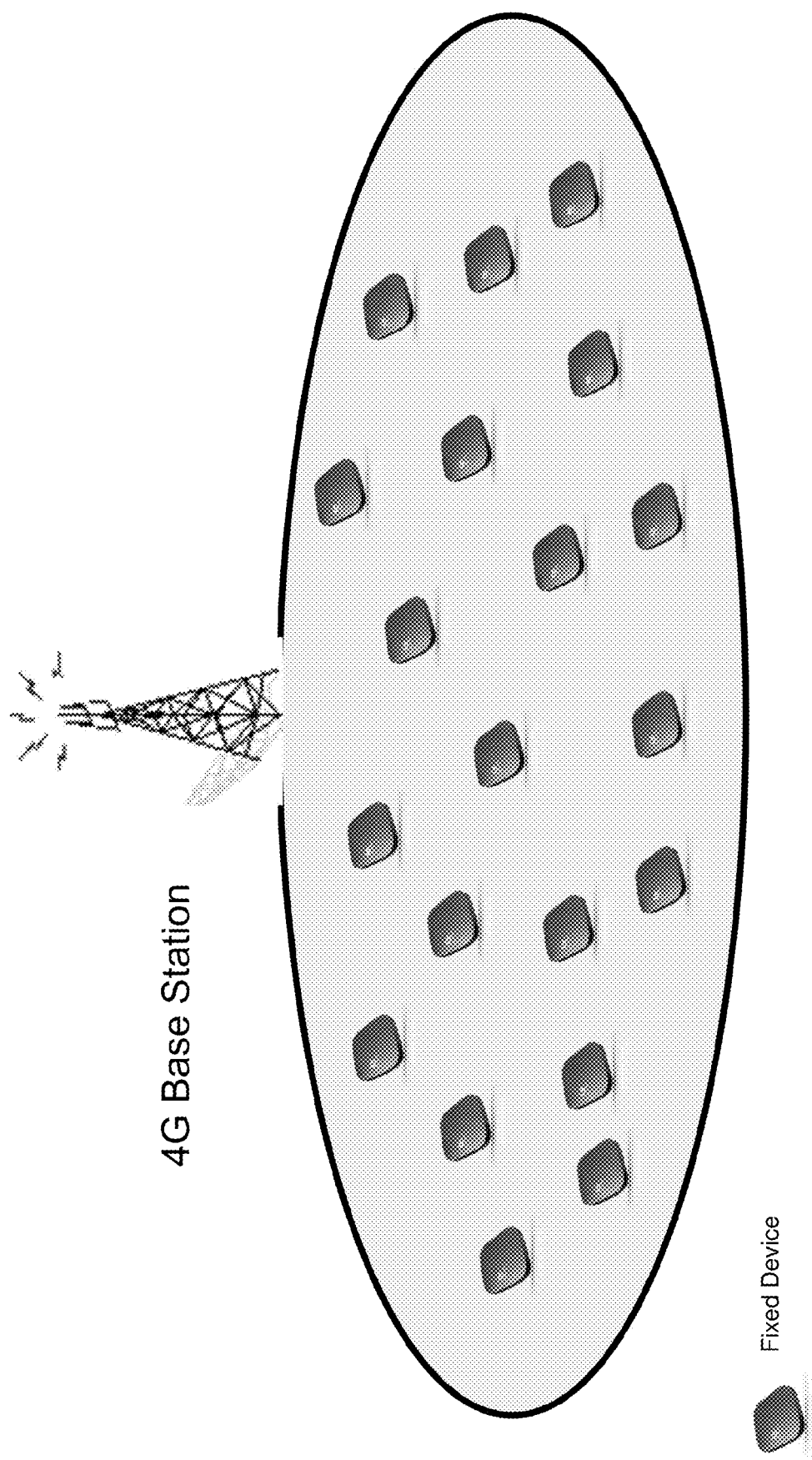
FIG. 2 is an illustration of an exemplary scenario applying the teachings of the present invention to a cell site serving only fixed devices.

For the purposes of illustration, two examples of the implementation of the present invention are now presented. In the first case, as represented by FIG. 2, a sector within a cell is populated by only fixed devices which tend to have higher data usage than other devices such as mobile smartphones. In this case, it is assumed that a 4G base station serves a cell to which 20 devices are assigned. These fixed devices might be, for example, wireless modems that are located within a household and generate a local Wi-Fi hotspot for use by Wi-Fi enabled devices within range. In this case, it is assumed that the theoretical maximum carrier capacity for the cell site is 7 Mbps and the average monthly tonnage per device is 25 GB. This gives a total Tonnage per Carrier of 20*25 GB or 500 GB. It is further assumed that the RF utilization is 90%. Using Equation (1) above, this results in a Simultaneous Devices value of (0.9*500)/(26*7)=2.47. This gives an OSF for this cell site of 20/2.47 (Total devices/simultaneous devices) of 8.09. System 100 would generate this value and as the device mix and/or any of the other factors described above changed, OSF for this cell site/carrier could be changed in real time to adjust to newly received historical data.

Figure 3:
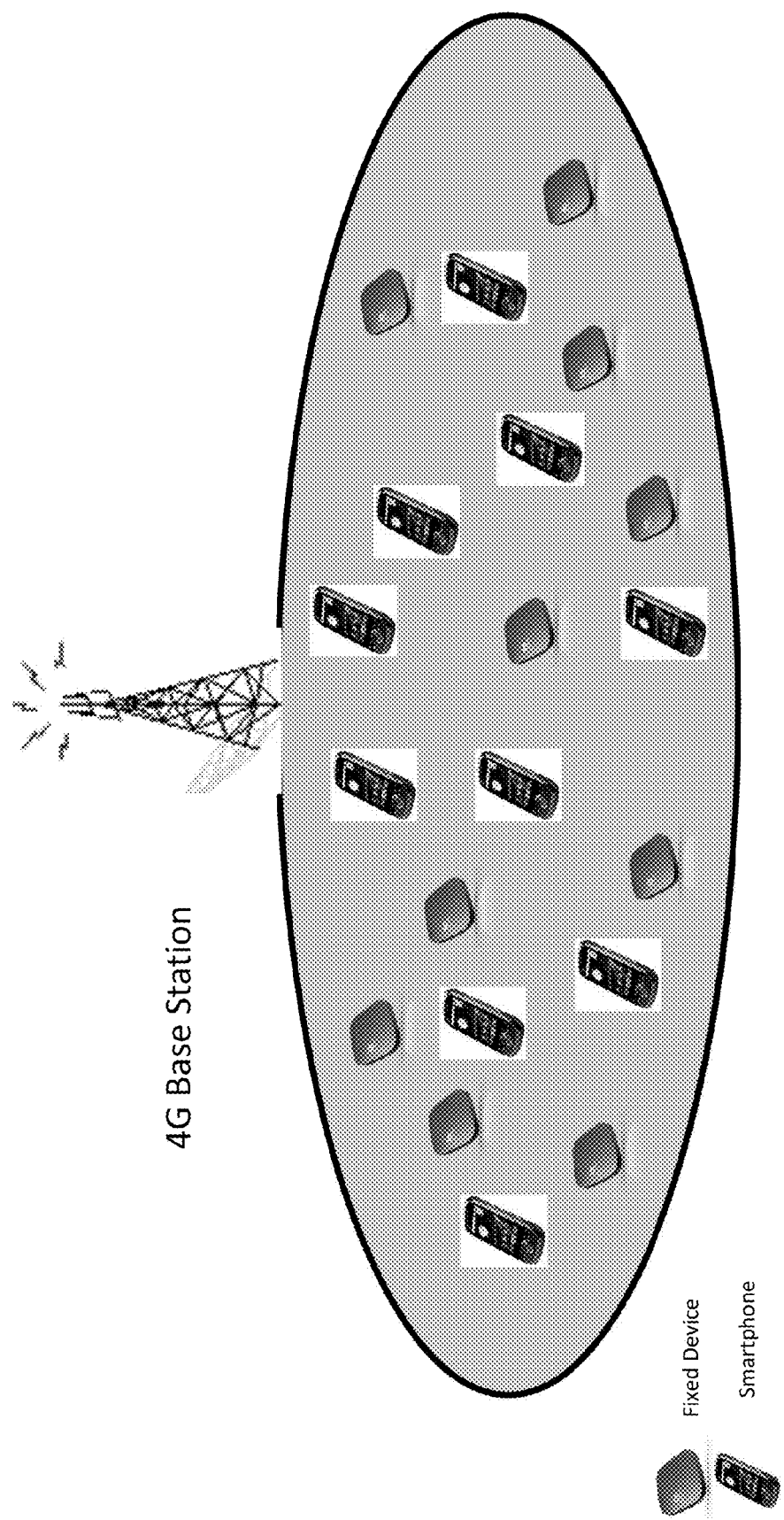
FIG. 3 is an illustration of an exemplary scenario applying the teachings of the present invention to a cell site serving a mixture of fixed devices and smartphone devices.

Turning to FIG. 3, a second example is provided wherein this cell site/carrier serves a mix of 10 fixed devices (same devices as above) and also 10 smartphones. The smartphones tend to place lower data demands on the network due to their mobile nature and typical user behavior associated with these devices as well as restrictions that may be placed on the users as a result of the data plans associated with these devices. In this case, it is assumed that the theoretical maximum carrier capacity for the cell site is 10 Mbps and the average monthly tonnage per device is 25 GB for the fixed devices and 2 GB per month for the smartphones. This gives a total Tonnage per Carrier of (10*25 GB)+(10*2 GB) or 270 GB. It is further assumed that the RF utilization is again 90%. Using Equation (1) above, this results in a Simultaneous Devices value of (0.9*270)/(26*10)=0.93. This gives an OSF for this cell site of 20/0.93 (Total devices/simultaneous devices) of 21.4. Because of the lower data demand in this cell, a higher OSF may be used as compared to the previous example.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A computer-implemented planning system for allocating resources within a network comprising:
   a cell site database storage device containing data associated with at least one cell site within said network;
   a usage data database storage device containing historical data associated with device usage for devices serviced by said at least one cell site; and
   a central processor for determining an oversubscription factor (OSF) value calculated as $$OSF = \frac{\text{Total Devices Served by Carrier}}{\frac{\text{Tonnage per Carrier}}{\text{Constant} \times \text{Max Carrier Capacity}}}$$

and applied to said at least one cell site wherein said OSF value is uniquely calculated specifically for said at least one cell site.

2. The planning system of claim 1 wherein said network comprises a plurality of cell sites and wherein said central processor calculates a unique OSF value for each of said cell sites.

3. The planning system of claim 2 wherein said OSF value calculation is further dependent upon an RF utilization factor.

4. The planning system of claim 2 wherein said OSF value calculation is dependent upon a theoretical maximum carrier capacity associated with said cell site.

5. The planning system of claim 2 wherein said OSF value calculation is dependent upon the total number of devices served by each of said plurality of cell sites.

6. The planning system of claim 1 wherein said OSF value is updated periodically as a result of changes to said historical data.

7. The planning system of claim 6 wherein additional carriers are automatically enabled based upon a decrease in said OSF value associated with said cell site.

8. The planning system of claim 6 wherein the number of carriers is automatically reduced based upon an increase in said OSF value associated with said cell site.

9. A method for allocating resources within a wireless network comprising the steps of:

receiving from a usage data database storage device, historical data associated with devices assigned to at least one cell site within said wireless network;

receiving from a cell site database storage device, data associated with the RF characteristics associated with said at least one cell site within said wireless network; and calculating, using a central processor, an oversubscription factor (OSF) value calculated as $$OSF = \frac{\text{Total Devices Served by Carrier}}{\frac{\text{Tonnage per Carrier}}{\text{Constant} \times \text{Max Carrier Capacity}}}$$

to be associated with said at least one cell site within said wireless network wherein said OSF value is based upon said RF characteristics and said historical data.

10. The method of claim 9 wherein said step of calculating an OSF value comprises calculating an OSF value which is a function of theoretical maximum carrier capacity.

11. The method of claim 9 wherein said step of calculating an OSF value comprises calculating an OSF value which is a function of RF utilization.

12. The method of claim 9 wherein said cell site comprises a plurality of sectors and each of said sectors is assigned a unique OSF value.

13. The method of claim 9 further comprising the step of periodically receiving updates to said historical data and re-calculating said OSF value based thereupon.

14. The method of claim 9 wherein said wireless network comprises a plurality of cell sites and a unique OSF value is calculated for each one of said plurality of cell sites.

* * * * *